Dec. 27, 1938.      C. O. HILL      2,141,437
VEHICLE DIRECTION SIGNAL
Filed Feb. 25, 1936      2 Sheets—Sheet 1
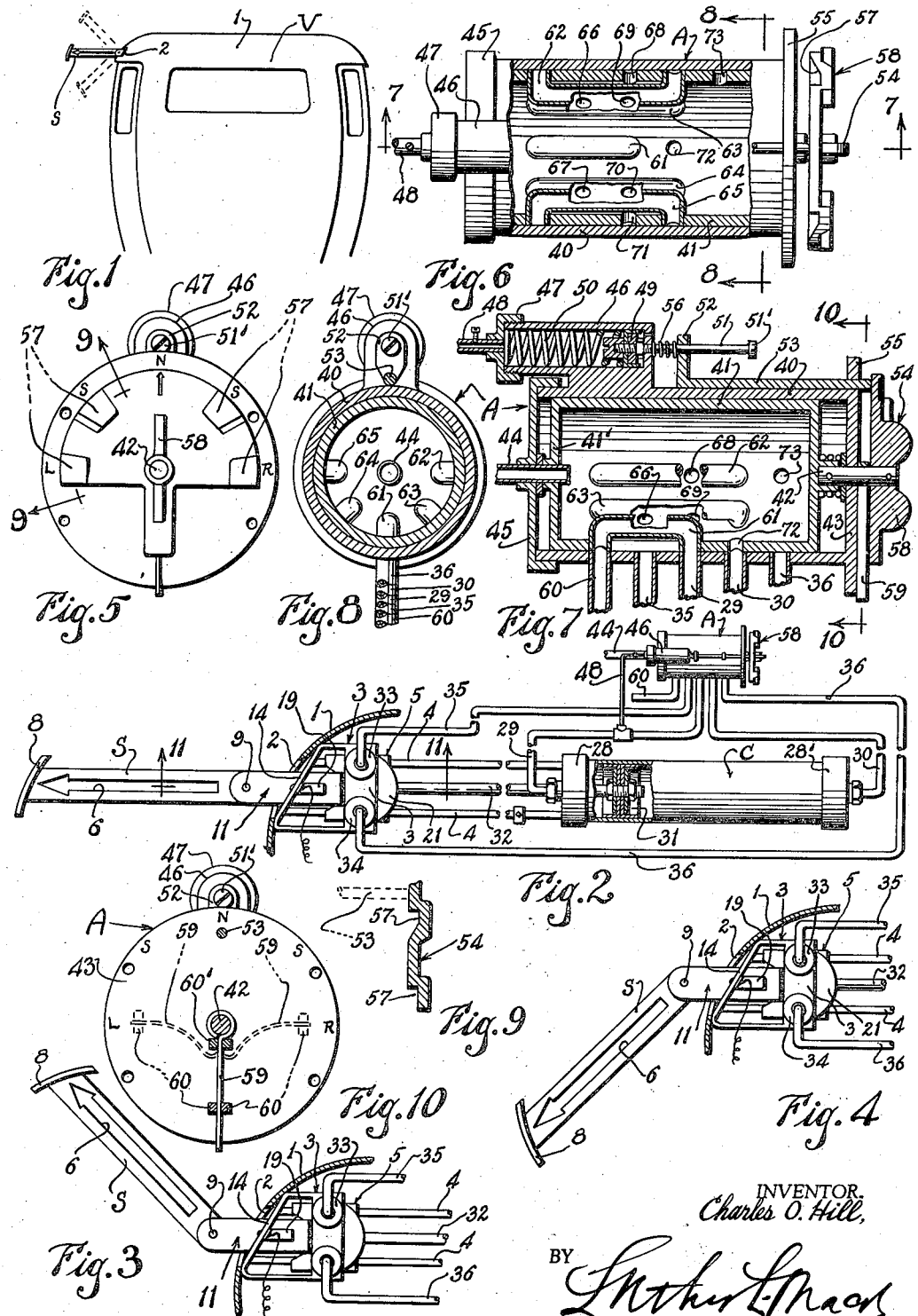
INVENTOR.
Charles O. Hill,
BY
ATTORNEY Dec. 27, 1938.   C. O. HILL   2,141,437
VEHICLE DIRECTION SIGNAL
Filed Feb. 25, 1936   2 Sheets-Sheet 2
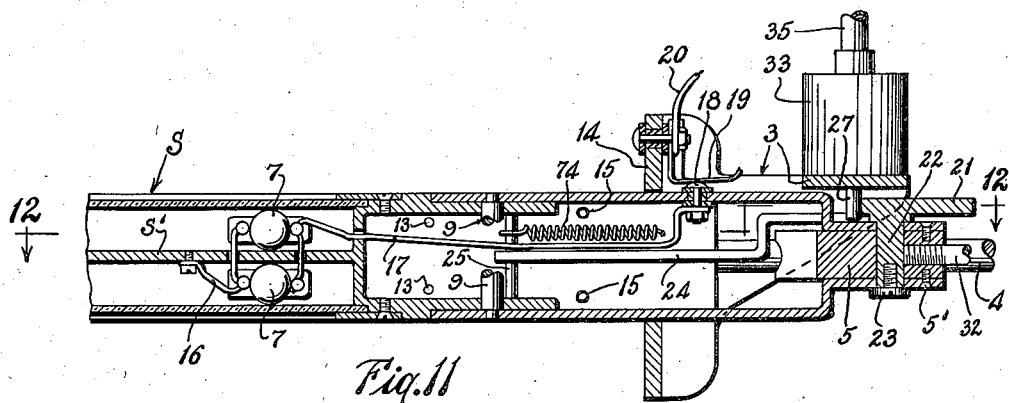
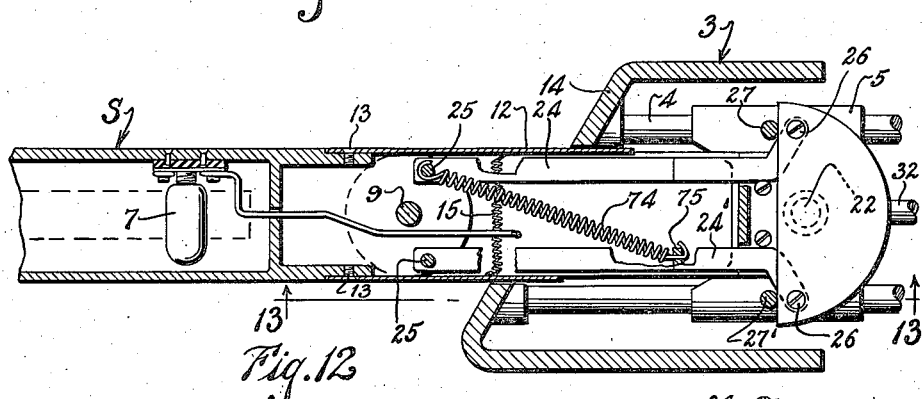
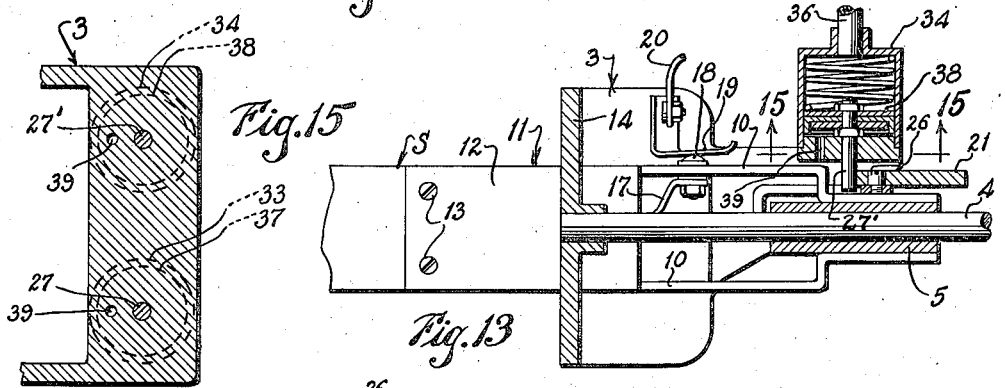
INVENTOR,
Charles O. Hill,
BY
ATTORNEY.
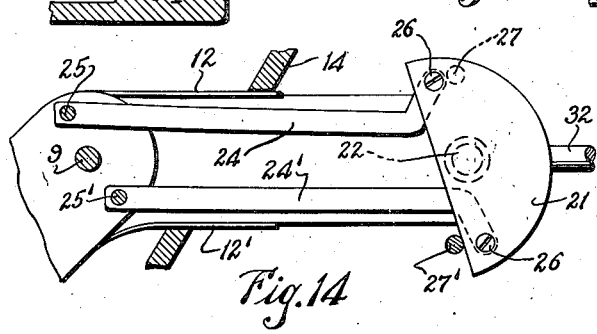

Patented Dec. 27, 1938

2,141,437

UNITED STATES PATENT OFFICE 2,141,437

VEHICLE DIRECTION SIGNAL

Charles O. Hill, Los Angeles, Calif.

Application February 25, 1936, Serial No. 65,573

7 Claims. (Cl. 116—39)

This invention relates to and has for an object the provision of a direction signal of the general type and character of that disclosed in my pending application for patent, filed December 8, 1934, Serial No. 756,572, now Patent Number 2,110,420, but including certain novel and valuable improvements which increase the utility and desirability of a direction signal applicable to modern automobiles.

In the consideration of my present invention it will be understood that my signal means includes a vacuum operated semaphore extensible from the top of a vehicle into three separate positions, i. e. horizontal, upwardly inclined and downwardly inclined positions, for indicating, respectively, left and right turns and stopping of the vehicle. An object of this invention is to provide automatically operable means for restoring the semaphore to normally concealed position at the completion of any of said operations.

A further object is to provide improved means for effecting the inclination of the semaphore either upwardly or downwardly as may be desired, and for mounting said semaphore so that it will operate with a minimum of effort and friction.

Another object is to provide an improved form of control means for regulating the application of air and vacuum to the semaphore and other elements. Still other objects may appear as the description progresses.

I have shown a vehicle direction signal embodying my said improvements in the accompanying drawings, subject to modification, within the scope of the appended claims, without departing from the spirit of my invention.

In said drawings:

Fig. 1 is a reduced scale view, in rear elevation, of a vehicle body equipped with my improved signal;

Fig. 2 is a side elevation of the signal unit apart from a vehicle and partly in section, with the semaphore horizontally extended as for indicating a contemplated left hand turn;

Figs. 3 and 4, are, respectively, fragmentary views of the signal means with the semaphore extended into upwardly and downwardly inclined positions, for indicating contemplated right hand turns and stopping of the vehicle;

Fig. 5 is a front end view of a control unit manually operable for regulating the application of air and vacuum to the signal means;

Fig. 6 is a plan of the control unit, partly in section;

Fig. 7 is a sectional elevation of the same on line 7—7 of Fig. 6;

Fig. 8 is a transverse section of the same on line 8—8 of Fig. 6;

Fig. 9 is a fragmentary section of the same on line 9—9 of Fig. 5;

Fig. 10 is an end elevation of the control unit with a portion omitted so as to indicate the several positions of an operating member thereon, as seen on line 10—10 of Fig. 7;

Fig. 11 is a longitudinal section of the operating means on line 11—11 of Fig. 2;

Fig. 12 is a longitudinal section thereof on line 12—12 of Fig. 11;

Fig. 13 is a sectional elevation of the same on line 13—13 of Fig. 12;

Fig. 14 is a fragmentary view of the semaphore and its connections; and

Fig. 15 is a section of one of the semaphore regulating cylinders on line 15—15 of Fig. 13.

A complete signalling unit such as is shown in Fig. 2 is assembled and mounted at the side between the front and the rear and within the top 1 of a vehicle V, as indicated in Fig. 1, and includes a semaphore S extensible through an opening 2 in the vehicle top 1 and operatively supported on a rigid base 3 suitably fixed in a position immediately inside of the top 1. An elongated cylinder C is also fixed in position within the top 1 and rearwardly of the base 3 and is connected with said base as by means of guide rods 4, 4, and on which a cross head 5 is longitudinally slidable, together with semaphore S to and from signalling position.

The semaphore S is preferably of rectangular hollow cross section and may have arrow shaped apertures 6 in the opposite sides thereof adapted to be covered with a transparent or translucent material so that light from the interior, as supplied by a suitable bulb, or bulbs 7, will be transmitted through said apertures so that the signal is visible from either front or rear and may have a partition S' separating said lights which may be of respectively different colors. The outer end of the semaphore is provided with a plate 8 curved and formed so as to seat in or over the opening 2 in the top 1, and the inner end of the semaphore is hinged at 9 to the opposite sides 10, 10, of an intermediate member 11 which operatively connects the semaphore with the cross head 5.

It will be noted that semaphore S has flat springs 12 and 12' overlying the edges of the sides 10, 10, of member 11 and attached to the inner end of the semaphore as by means of screws 13, thereby providing covers for the top and bottom of member 11 where it is extended from the top 1 through opening 2. Said springs, as shown in Fig. 14, are extensible through an opening in an inclined portion 14 of base 3 and flex in opposite directions as the semaphore is inclined upwardly and downwardly, the member 14 in such case serving to hold the springs engaged with the upper and lower edges of sides 10 of member 11. Also, said springs are tensioned against the sides 10 by means of one or more tension springs 15, as shown in Figs. 11 and 12.

Lamps 7 may be grounded to the frame of the semaphore as at 16 and connected by means of a wire 17 with a terminal 18 on the inner portion of member 11 which terminal is adapted for contact with a fixed contact 19 held on the inner side of portion 14 of base 3 and from which a wire 20 may lead to a source of electricity.

Crosshead 5 is rigidly secured by screws 5' or other suitable means to the inner end of member 11 so that the semaphore S and member 11 will commonly slide therewith on the guide rods 4, 4. Said crosshead also carries a semi-circular plate 21 which has a stem 22 hingedly held in the cross head and retained as by means of a screw 23. (See Figs. 11 and 12.) Plate 21 is rearwardly spaced from the inner end of semaphore S and is connected in parallel therewith by means of a pair of links 24 and 24', the outer ends of said links being hinged at 25, and 25', respectively, to the semaphore while the inner ends of the links are bent outwardly and hinged at 26 and 26' to points on the plate which are outwardly of the member 11.

As in the previous form of device disclosed in my said pending application the swinging of the semaphore is influenced and effected by means of vacuum operated plungers 27 and 27' which are adapted to be selectively retracted from extended positions out of the path of the outer edge of the hinged plate 21. Thus, as shown in Fig. 14, the semaphore is inclined in one or the other directions as the edge of the plate in its outward movement engages one of the pins 27 or 27' and is tilted. The tilting of the plate obviously effects the corresponding tilting of the semaphore through the links 24 and 24'.

Cylinder C has heads 28 and 28' at its front and rear ends, respectively, to which are connected vacuum and air tubes 29 and 30 both of which are connected with a control valve A, as shown in Fig. 2. A piston 31 is slidable in said cylinder C and has a stem 32 extended outwardly through head 28 to a point of connection with crosshead 5, so as to extend and retract the semaphore S, crosshead 5 and piston 31 as vacuum is applied to opposite ends of said cylinder.

Member 3 carries a pair of vacuum cylinders 33 and 34 which are arranged on opposite sides of the axis of the signal unit and are supported on the top of said member 3. Said cylinders are connected by means of tubes 35 and 36, respectively, with control valve A and have plungers 37 and 38 slidable therein and from which the plungers 27 and 27', respectively, extend from the bottoms of the cylinders to position adjacent the plane of the plate 21. An air vent 39 is provided in the bottom of each of the cylinders 33 and 34.

The valve A includes a cylindrical body 40 and an inner cylinder 41 which is closed at its ends and is revoluble within said body, as shown in Fig. 7. One end of said valve has a trunnion 42 which is rotatable in the end 43 of the body 40 and the other end of the valve has an inlet tube 44 which is held in a head 45 at an end of the body and is journalled in the end 41' of the inner cylinder 41 and serves to connect the inner cylinder 41 with a source of vacuum, as a pump, (not shown).

The connections between the cylinder 41 and the cylinders C, 33 and 34 are such that air and vacuum may be applied to the pistons in said cylinders for initially extending the semaphore to the position shown in Fig. 2, and thereafter to the positions shown in Fig. 3 or 4, as may be selected by an operator in accordance with his intentions in the proposed movement of the vehicle V.

There is provided on the control unit A means for automatically restoring the cylinder 41 to neutral position and the semaphore to retracted position at the end of each signalling operation. Said means includes a sub-cylinder 46 formed on or attached to the valve body 40 and having one end closed by a head 47 and having a vacuum connection 48 in the form of a bleeder connected as with the tube 29 leading from the outer end of cylinder C. A piston 49 is slidable in cylinder 46 and is tensioned by means of a spring 50 which tends to overcome the vacuum pull on the piston and to restore it to the right hand end of the cylinder, as shown in Fig. 7. Said piston has a stem 51 which extends therefrom and through a portion 52 of a pin 53 and the outer end of said pin is adapted to engage the inner face of a rotatable member 54 which is held on trunnion 42 at an end of the valve body and is slidable in a flange 55 thereon.

Pin 53 is tensioned by means of a spring 56 which compresses between the end of cylinder 46 and portion 52 of pin 53 and tends to urge said pin outwardly so that its end will engage the inner face of member 54 and one of several notches 57 (see Fig. 9) which are formed on the inner face of member 54, for holding the operating member 54 stationary for a predetermined length of time and the maintenance of a given signal for a corresponding length of time, after which the operating member is released and the signal is automatically restored to normally retracted position, all as hereinafter described.

Member 54 has a knob 58, or in lieu thereof, wings such as are shown in Figs. 5 and 7 by means of which it may be rotated to different positions on valve body end 43 for establishing and maintaining proper connections for giving selected signals. Said member 54 is rotated against the tension of a spring 59 which has its upper end looped around trunnion 42 and its lower end slidably held between a pair of lugs 60, 60, on the member 54. Lugs 60', 60' on the end 43 retain the inner end of spring 59 against rotation. Thus as said operating member is turned in either direction the spring 59 is flexed, as indicated by broken lines in Fig. 10 and tends to restore the operating member to neutral position after a given interval of time.

Upon the operation of the control valve for effecting any desired signal, vacuum is applied from tube 29 through tube 48 to cylinder 46 and as it requires a certain interval of time for evacuating the cylinder 46 of air and the creation of sufficient vacuum therein to retract piston 49, the piston will not retract sufficiently to retract its stem 51 so as to engage the head 51' thereon with portion 52 of pin 53 so as to retract said pin from engagement with one of the notches 57 in member 54, thereby releasing said pin so as to permit the tension of spring 59 to restore the operating member to neutral position.

Valve body 40 has an air intake 60 which is adapted for selective registration with internal tubes 61, 62, 63, 64 and 65 which bridge and connect certain of the connections with the valve body for establishing and maintaining vacuum and air connections with the several elements of the system. As shown in Fig. 7, tube 61 supplies air from the atmosphere through inlet 60 to the outer end of cylinder C.

The interior of valve A is constantly vacuumized from inlet 44 and the air inlet 60 is connected selectively with whichever of the several cylinders as may be desirable and necessary for effecting desired signals. It will be obvious that for either a right or left hand turning signal or a stop signal it is necessary to move piston 31 in cylinder C and semaphore S outwardly to signalling position. Hence in every case vacuum is applied through valve A and tube 29 to the outer end of cylinder C so as to move piston 31 and semaphore S to the position shown in Fig. 2. In such position, which is the left turn signal, the outer edge of plate 21 engages both of the plungers 27 and 27' and stops the outward movement of the signal. If a stop or right turn signal is to be given the continued application of vacuum to piston 31 and the application of vacuum to either of the plungers 27 or 27', as the case may be, retracts one of said plungers and causes plate 21 to swing on its axis 22, as shown in Fig. 14 by reason of its engagement with the other of said plungers, and the semaphore S is correspondingly swung upwardly or downwardly by reason of its connections 24 and 24' with said plate.

Thus vacuum is applied to a cylinder 33 or 34 by so rotating valve A as to connect the interior of said valve with the required cylinder. As shown in Fig. 7 the connections are such as to restore the piston 31 to normally retracted position in cylinder C through tube 30. A plurality of ports are provided in the wall of the member 41 of valve A for selective registration with tubes 35, 29, 30 and 36, respectively, which are instrumental for selectively applying vacuum to cylinders C, 46, 33 or 34. Thus either of the ports 66 or 67 will register with tube 35 for applying vacuum to cylinder 33; any one of ports 68, 69, 70 and 71 will register with tube 29 for applying vacuum to the outer end of cylinders C and 46; port 72 will register with tube 30 for applying vacuum to the inner end of cylinder C and port 73 will register with tube 36 for applying vacuum to cylinder 34.

For convenience in operation the flange 55 of valve A has diametrically opposite right and left turn legends and positions thereon, a single neutral legend and position, and dual stop legends and positions on either side intermediate the right and left turn positions, as illustrated in Fig. 10. For this reason the bridging tubes 62 and 65 in member 41 are diametrically opposite and correspond to the right and left hand turning positions, the tubes 63 and 64 are spaced to correspond to the two stop positions and the tube 61 is neutrally positioned. Thus, to effect a right hand or stop signal the operating member may be moved in one direction and to effect a left hand or stop signal the said member is moved in an opposite direction.

It is quite apparent that as vacuum is applied to either end of the cylinder C air must be admitted to the other end thereof so as to permit the free movement of piston 31 and semaphore S. Thus, for any of the five signalling positions air must be admitted through inlet 60 and one of the tubes 61, 62, 63, 64 and 65 and either tube 29 or 30 to cylinder C while for two positions vacuum is simultaneously applied to one of the cylinders 33 or 34 through either tube 35 or 36. Whenever vacuum is applied to the outer end of cylinder C it is simultaneously applied to cylinder 46, as hereinbefore described.

A tension spring 74 is attached at its outer end to the pin 25 and at its inner end to a transverse portion 75 of link 24' as shown in Figs. 11 and 12. Said spring serves to counter-balance the semaphore when it is swung downwardly in the position shown in Fig. 4, and tends to restore the semaphore to normally horizontal position as shown in Fig. 2.

From the foregoing description of the structure and operation of my signalling means it will be observed that I have provided in addition to means for manually operating the device for displaying three different signals an automatically operable means for restoring the signalling means to neutral position at the completion of each operation. The said restoration means is vacuum operated and serves to effect the release of the locking pin 53 from the operating member 54 so that said operating member may be returned to normal position in either direction by means of the tension of its spring 59.

What I claim as novel and desire to secure by Letters Patent, is:

1. A direction signal for vehicles comprising: a cylinder, a piston therein, a semaphore operatively connected with said piston for pivotal movement relative thereto and for bodily movement therewith, a rotatable control valve connected with a source of vacuum and with opposite portions of said cylinder for applying vacuum to opposite sides of said piston so as to alternately slidably extend and retract said semaphore, an operating member for said valve, means controlled by said operating member for inclining said semaphore to different signalling positions from said slidably extending position, and means associated with said operating member for automatically releasing said operating member after an interval of time so as to permit the restoration of all of said means to normal positions.

2. A direction signal for vehicles comprising: a cylinder, a piston therein, a semaphore operatively connected with said piston for pivotal movement relative thereto and for bodily movement therewith, a rotatable control valve connected with a source of vacuum and with opposite portions of said cylinder for applying vacuum to opposite sides of said piston so as to alternately slidably extend and retract said semaphore, an operating member for said valve, means controlled by said operating member for inclining said semaphore to different signalling positions from its slidably extended position, means associated with said operating member for automatically releasing said operating member after an interval of time so as to permit the restoration of all of said means to normal positions, said last mentioned means including a locking member engageable with said operating member, and vacuum operated means connected with said locking member for disengaging the locking member from the operating member.

3. A direction signal for vehicles comprising: a cylinder, a piston therein, manually controlled vacuum operated means for reciprocating said piston, a semaphore arranged for movement to and from a plurality of signalling positions, a crosshead slidable with said piston, a member pivotally held on said crosshead and having parallel connections with said semaphore at points outwardly of its axis, said semaphore being hingedly supported on said cross-head, and vacuum operated means engageable with said pivoted member for regulating the tilting of said member and of said semaphore in accordance with desired signalling intentions.

4. A direction signal for vehicles comprising: a cylinder, a piston therein, manually controlled vacuum operated means for reciprocating said piston, a semaphore arranged for movement to and from a plurality of signalling positions, a crosshead slidable with said piston, a member pivotally held on said crosshead and having parallel connections with said semaphore at points outwardly of its axis, said semaphore being hingedly supported on said cross-head, vacuum operated means engageable with said pivoted member for regulating the tilting of said member and of said semaphore in accordance with desired signalling intentions, and means for restoring said semaphore and said member to normal position at the completion of a signalling operation.

5. A direction signal for vehicles comprising: a cylinder, a piston therein, manually controlled vacuum operated means for reciprocating said piston, a semaphore arranged for movement to and from a plurality of signalling positions, a crosshead slidable with said piston, a member pivotally held on said crosshead and having parallel connections with said semaphore at points outwardly of its axis, said semaphore being hingedly supported on said crosshead, vacuum operated means engageable with said pivoted member for regulating the tilting of said member and of said semaphore in accordance with desired signalling intentions, a slidable support for said semaphore, and flexible tensioned plates secured to and extending inwardly from said semaphore and overlying said support, for the purpose described.

6. A vehicle direction signal comprising a reciprocal operating member, a pivoted semaphore arranged for bodily movement by said operating member, a cross head slidable with said operating member, a member pivoted on said cross head and having parallel connections with said semaphore at points outwardly of its axis, means for pivotally supporting the semaphore on said cross head, and means engageable with said pivoted member for regulating the tilting thereof and of said semaphore.

7. A vehicle direction signal comprising a reciprocal operating member, a pivoted semaphore arranged for bodily movement by said operating member, a cross head slidable with said operating member, a member pivoted on said cross head and having parallel connections with said semaphore at points outwardly of its axis, means for pivotally supporting the semaphore on said cross head, means engageable with said pivoted member for regulating the tilting thereof and of said semaphore, and means for restoring said semaphore and said pivoted member to normal position at the completion of a signalling operation.

CHARLES O. HILL.